US008219063B2

(12) United States Patent
Rogel et al.

(10) Patent No.: US 8,219,063 B2
(45) Date of Patent: Jul. 10, 2012

(54) CONTROLLING USAGE IN MOBILE DEVICES VIA A VIRTUALIZATION SOFTWARE LAYER

(75) Inventors: Lawrence S. Rogel, Brookline, MA (US); Julia B. Austin, Duxbury, MA (US); Scott W. Devine, Katanah, NY (US); Srinivas Krishnamurti, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 400 days.

(21) Appl. No.: 12/492,594

(22) Filed: Jun. 26, 2009

(65) Prior Publication Data
US 2010/0330953 A1 Dec. 30, 2010

(51) Int. Cl.
*H04M 11/00* (2006.01)
(52) U.S. Cl. ........................... 455/405; 455/411
(58) Field of Classification Search .................. 455/405, 455/411
See application file for complete search history.

(56) References Cited

U.S. PATENT DOCUMENTS

| 7,898,428 | B2 * | 3/2011 | Dietz et al. .................. 340/670 |
| 2006/0047665 | A1 | 3/2006 | Neil |
| 2006/0141984 | A1 * | 6/2006 | Taglienti et al. .............. 455/406 |
| 2007/0043860 | A1 * | 2/2007 | Pabari ........................... 709/224 |
| 2007/0275692 | A1 * | 11/2007 | Gruchala et al. .............. 455/405 |

OTHER PUBLICATIONS

Notification of Transmittal of the International Search Report and the Written Opinion of the International Searching Authority, or the Declaration, Sep. 14, 2010, Patent Cooperation Treaty "PCT", Rijswijk, The Netherlands.
Bryan D. Payne et al., "Secure and Flexible Monitoring of Virtual Machines," Computer Security Applications Conference, 2007. ACSAC 2007. Twenty-Third Annual . . . , Dec. 1, 2007.
Fernando Rodriguez-Haro et al., "Autonomous Management in Virtual-Machine-Based Resource Providers," Self-Adaptive and Self-Organizing Systems, 2008. SASO '08. Second IEEE International Conference on, IEEE, Piscataway, NJ, USA, Oct. 20, 2008.

* cited by examiner

*Primary Examiner* — Kamran Afshar
*Assistant Examiner* — Yousef Rod (57) ABSTRACT

One embodiment is a method of controlling usage in a virtualized mobile device including virtualization software that supports one or more virtual machines, the method including: (a) receiving control information at the virtualized mobile device that includes one or more limits pertaining to one or more uses of the virtualized mobile device; (b) collecting usage information relating to the one or more uses; (c) determining whether usage information corresponding to one of the one or more uses exceeds a corresponding one of the one or more limits; and if so; (d) carrying out a predetermined action relating to the one of the one or more uses.

20 Claims, 1 Drawing Sheet

CONTROLLING USAGE IN MOBILE DEVICES VIA A VIRTUALIZATION SOFTWARE LAYER

CROSS-REFERENCE TO RELATED APPLICATIONS

This application is related to the following applications, which applications are assigned to the assignee of this application, have been filed the same day as this application, and are entitled: "Virtualized Mobile Devices"; "Providing Security in Virtualized Mobile Devices"; "Preventing Malware Attacks in Virtualized Mobile Devices"; and "Migrating Functionality in Virtualized Mobile Devices."

BACKGROUND

A mobile device typically refers to a device such as a mobile phone (for example, an internet-connected, multimedia, smart phone designed and marketed by Apple Inc under the name iPhone or a BlackBerry® smart phone sold by Research In Motion Limited), a media player, a handheld gaming unit, a calculator, and so forth. As is known, such mobile devices typically have limited physical memory in comparison to desktop or laptop computers, and because they typically operate under battery power, due to their power saving features, they use processors having an ARM architecture (previously, the Advanced RISC Machine, and prior to that the Acorn RISC Machine). As is also known, an ARM architecture refers to a 32-bit RISC processor architecture developed by ARM Holdings PLC, Maidenhead, United Kingdom, that is widely used in a number of embedded designs. Such issues related to memory and CPU restrictions cause issues in using such mobile devices.

SUMMARY

One or more embodiments of the present invention provide methods for controlling usage in a virtualized mobile device. In particular, one embodiment of the present invention is a method of controlling usage in a virtualized mobile device comprised of virtualization software that supports one or more virtual machines, the method comprising: (a) receiving control information at the virtualized mobile device that includes one or more limits pertaining to one or more uses of the virtualized mobile device; (b) collecting usage information relating to the one or more uses; (c) determining whether usage information corresponding to one of the one or more uses exceeds a corresponding one of the one or more limits; and if so; (d) carrying out a predetermined action relating to the one of the one or more uses.

DETAILED DESCRIPTION

Figure 1:
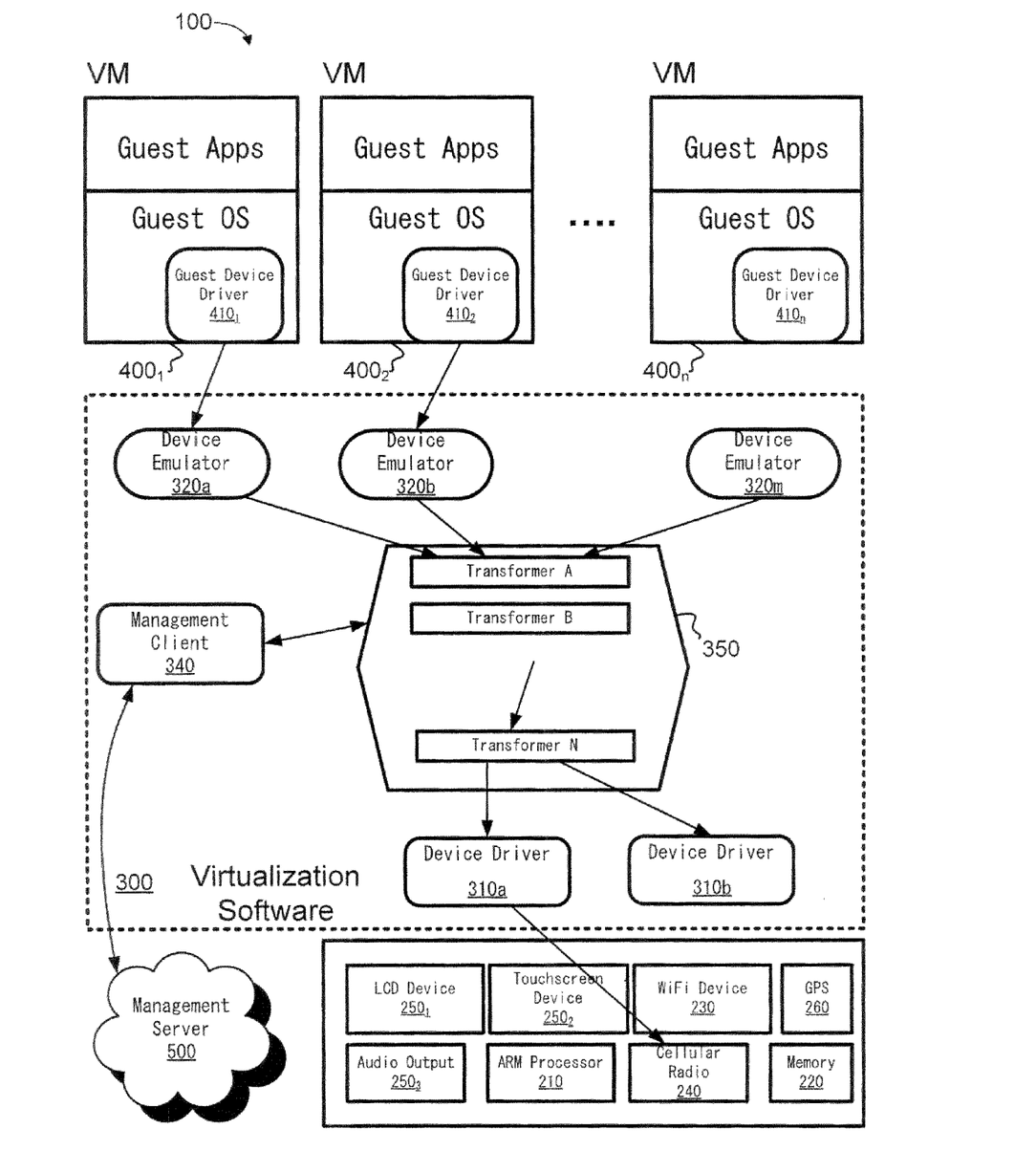
FIG. 1 shows a block diagram of a virtualized mobile device that is fabricated in accordance with one or more embodiments of the present invention.

FIG. 1 shows a block diagram of virtualized mobile device 100 that is fabricated in accordance with one or more embodiments of the present invention. As shown in FIG. 1, virtualized mobile device 100 includes mobile device hardware 200, virtualization software layer 300 that interacts with mobile device hardware 200, and virtual machines ("VMs") $400_1$-$400_n$ that interact with virtualization software layer 300. As further shown in FIG. 1, mobile device hardware 200 includes CPU 210 (for example, and without limitation, ARM processor 210), memory 220, various data network interface devices 230 (for example, and without limitation, wifi device 230), various telephonic interfaces 240 for example, and without limitation, cellular radio 240), various mobile device display and audio input/output devices $250_1$-$250_n$ (for example, and without limitation, LCD display device $250_1$, touch screen display device $250_2$, audio input/output device $250_3$ (for example, and without limitation, a speaker), and so forth), and location determination device 260 (such as, for example, and without limitation, GPS determining device 260).

One or more embodiments of inventions described herein provide methods for use of virtualized mobile devices. As used herein, the term mobile device is used in the broadest manner so that it includes devices such as, for example, and without limitation, a mobile and/or cellular telephone; a smart phone; an internet-connected, multimedia, smart phone; a media player; a handheld gaming unit; a calculator; and so forth.

In accordance with one or more embodiments of the present inventions, as shown in FIG. 1, virtualized mobile device 100 includes virtualization software layer 300 such as, for example, and without limitation, a hypervisor (sometimes referred to as a virtual machine monitor), that runs on mobile device hardware 200 to provide a virtualized mobile device. In accordance with one or more such embodiments, in such a virtualized mobile device, applications that drive the inventive methods described herein, run: (a) on top of operating systems (sometimes referred to as guest operating systems ("guest OSs"), i.e., as a guest of virtualization software layer 300) as guest OSs $410_1$-$410_2$ where one of ordinary skill in the art of computer virtualization readily appreciates how such guest OSs $410_1$-$410_n$ are supported by virtualization software layer 300; (b) within application containers that are supported by virtualization software layer 300; (c) a software module within virtualization software layer 300; or (d) some combination of the foregoing. A pending patent application entitled "In-place Shadow Tables for Virtualization," having Ser. No. 12/466,159, which was filed on May 14, 2009, is owned by the assignee of the present application, is incorporated by reference herein, and describes methods for providing virtualization software layer 300 for virtualized mobile device 100.

As one of ordinary skill in the art can appreciate from FIG. 1, several VMs $400_1$-$400_n$ may be executing on virtualized mobile device computer 100, and they are protected from each other just as if they were executing on separate devices, i.e., any one VM is not any more vulnerable to any co-located, compromised (i.e., virus infected) VM than it would be if such VMs were located on physically separate handsets. This is referred to as isolation, and isolation is important in mobile devices such as mobile phones to protect the baseband stack, i.e., a part of the mobile phone that interacts with a cellular network. This is because a compromised baseband stack can raise havoc on the entire cellular network. Indeed, many smart phones currently have two processor chips to provide such isolation, and the baseband software is burned into ROM. However, the advent of multicore chips and higher capacity single cores make it advantageous to combine baseband and application functions onto a single chip.

As further indicated in FIG. 1, guest OSs $410_1$-$410_n$ execute guest applications. As is well known, the CPU, memory, and devices must all be virtualized to have a VM that is decoupled from actual hardware (for example, where each VM believes it is executing on a dedicated handset, i.e., a physical phone). There are several choices when designing virtualization software. In accordance with one such choice, the guest OS can be run as is, which is known as full virtualization, or in accordance with a second choice, the source code can be modified, which is known as para-virtualization. As is well known, a mobile device typically has one or more processors, each of which is most often an ARM core.

As is known, a typical mobile device includes a large collection of devices, such as, for example and without limitation, a screen, a keyboard and buttons, a radio, a GPS, a Bluetooth device, a camera, an imager, a microphone, a speaker, and so on.

As shown in FIG. 1, guest OSs $410_1$-$410_n$ include a set of device drivers (shown illustratively by single guest device drivers $410_1$-$410_n$). Rather than interact with actual devices, these guest device drivers interact with emulated or virtualized devices. As further shown in FIG. 1, virtualization software 300 includes device emulators $320_a$-$320_m$ that virtualize the devices of VMs $400_1$-$400_n$, and virtualization software 300 includes device drivers (shown illustratively by device drivers $310_a$ and $310_b$) that interact with the physical devices of mobile device 100. A fully virtualized guest OS device driver will attempt to read or write specific physical addresses associated with physical devices; however, virtualization software 300 will mark these pages as non-readable and non-writable so that each access traps to virtualization software 300 which has device emulator software decode the appropriate operation. Alternatively, the guest device driver may be para-virtualized so that it makes direct calls to virtualization software 300. In either case, an emulated device eventually communicates with an actual device driver which, in turn, interacts with a physical device. Thus, the flow is: guest device driver to device emulator to actual device driver to physical device. The actual device driver that interacts with the physical device may be part of virtualization software 300 or it may reside in a special driver VM so that "buggy" driver code does not corrupt the rest of virtualization software 300, and in some cases, because the actual device driver may assume a particular operating system.

As shown in FIG. 1, in accordance with one or more embodiments of the present invention, a VM believes it is interacting with a physical device while, in actuality, it is interacting with a device emulator. Further, in accordance with one or such embodiments, this device emulator sends data through transformer stack 350 which is comprised of a series of transformers, including filters, data transformers, multiplexors, and/or demultiplexors. In accordance with one or more further embodiments, one or more of the device emulators interact directly with the device drivers.

In accordance with one or more embodiments of the present invention, transformer stack 350 transforms data as it flows between a device emulator and an actual device driver. In accordance with one or more such embodiments, the data is streaming, but in accordance with further embodiments, control streams and data packets may reside in shared memory. In accordance with one or more such embodiments, the transformers are bi-directional in that control and data can flow in either direction. Simple transformers have two function pointers that indicate the next transformer (or device emulator or device driver) in a data path - - - , for example, one function pointer for a "forward" path from a device emulator to an actual device driver, and another function pointer for a reverse path from an actual device driver to a device emulator. Multiplexors are transformers that have additional function pointers for reverse paths, and device choosers or demultiplexors are transformers that have additional function pointers for forward paths, depending on the physical device driver that will be used. As shown in FIG. 1, transformer stack 350 includes transformers A-N. In addition, in accordance with one or more embodiments of the present invention, transformer stack 350 may direct data flow in a path from a first device emulator to another device emulator. As will be described below, this enables a second VM to receive communications send by a first VM, where the second VM acts as an intermediary to enable it to affect functionality.

A VM may assume it is contained in mobile device (for example, a handset) having a particular physical device (which physical device is emulated by virtualization software 300), but there may not be any such corresponding physical device in the handset. For example, the VM may assume the handset has a wifi device, but the handset may only have 3G and USB Ethernet devices. In such a case, virtualization software 300 would provide a transformer, for example and without limitation, a device chooser or demultiplexor, that would route a device emulator to one of a set drivers for the actual physical devices. Such a transformer is an instance of a device data stream transformer. In accordance with one or more embodiments of the present invention, there may be other transformers along the path through transformer stack 350 as well. For example, and without limitation, network communication from a particular VM may also be encrypted or compressed by a transformer.

A mobile device such as a handset may have several VMs concurrently executing and accessing their guest devices. As set forth above, for each guest device in each VM, there is a device emulator in virtualization software 300 (for example, each VM assumes it has a screen and a keyboard). As such, virtualization software 300 must multiplex access to each physical device. Exactly how the multiplexing works depends on the particular device. Some physical devices can be shared (for example, many handsets vibrate to communicate with an owner in a semi-silent way, and in some cases, any VM should be able to vibrate the battery). However, some physical devices may be exclusively allocated to a VM such as a keyboard. For example, a keyboard is usually dedicated to a "foreground" VM, i.e., given the size of the screen, it is likely to be allocated exclusively, and VMs running in the "background" may have their screens "thumbnailed" so that a user can see a small image of the screen for each VM when switching between VMs.

In such cases, a transformer, for example, and without limitation, a multiplexor has to route input data to the appropriate VM. Note that the user may have to take action using a user interface to allocate a physical device exclusively in accordance with any one of a number of methods because it is difficult to automatically decide which VM gets exclusive access to, for example, a Bluetooth device.

As further shown in FIG. 1, in accordance with one or more embodiments of the present invention, management server 500 interacts with management client 340 in virtualization software 300 to insert, delete or configure various ones of transformers A-N in transformer stack 350. Thus, for example, management server 500 can control logic inside transformer stack 350 to remote a device, to multicast its data, or to use a particular physical device. One way to manage transformer stack 350 in a dynamic fashion is for each transformer to maintain a function pointer table indicating the next transformer on a path; as set forth above, simple transformers have two pointers, one for each direction. Then, virtualization software 300 quiesces communication to and from each VM. Then, when all VMs are quiesced, the function pointer tables in each relevant transformer can be updated, thereby modifying flow through transformer stack 350. The series of transformers might be long so it may be useful to keep overhead small. For example, there may be no need to stream data or to copy it between each transformer. In addition, control packets may be small, and as such, they can often he held in a few registers. In further addition, the data, for the most part, can stay in memory; with virtualization software 300 mapping this memory to the address space of each transformer, VM, and device driver that may need to examine the data.

Inserting, deleting, or modifying a transformer may compromise security, isolation, integrity, reliability, and so forth of the entire device. As such, in accordance with one or more embodiments of the present invention, the chain of transformers in transformer stack 350 is run in user mode and can only address data buffers and storage within transformer stack 350. Also, in accordance with one or more such embodiments, the keyboard and screen, ought to be directly accessible by management client 340 so that it cannot he faked or interposed by some untrusted software.

As is well known, a virtual appliance (VA) is software where an application and all necessary operating system services are packaged together and run as a VM. In other words, it is a complete software stack that is managed and maintained as a unit with reduced operating system size. In accordance with one or more embodiments of the present invention, one or more guest device drivers in a VA (or a VM) may interact with device emulators that interact with transformer stack 350, and one or more guest device drivers in a VA (or VM) may interact directly with device drivers for physical devices without going through transformer stack 350. In accordance with one or more further such embodiments, one or more such device emulators that interact with transformer stack 350 may interact with another device emulator (as directed by transformer stack 350) to enable a VA (or VM) to act as an intermediary in a communication. Thus, in accordance with one or more embodiments of the present invention, control flow from a guest OS device driver may go to an intermediary VM or VA. There is no need for software to distinguish between an actual device and an emulated one. Thus, a VM may not he able to tell if its GPS readings are coming from a real GPS or from a log of previous readings.

The term "pervasive computing services," as used herein, includes services such as a device finding nearby devices and making its own resources available to other devices. What devices cooperate, the authentication model, and numerous other details all make use of a device's remoting capability. For pervasive computing services applications, a special application is needed for each device and each operating system. Consider, for example, a group camera use case where: (a) an application on one phone takes a picture and advertises its availability over a Bluetooth connection as well as over a local ad-hoc wifi-network; (b) all other phones on the network have an application that searches for this service and moves the picture; and (c) an authentication mechanism is used to ensure that the pictures are only sent to those in the group. In this example, some phones may have GPS and tag the image accordingly, while others may have an ability to add notes directly to the image. An application that merely fetches an image from a remote location may not he able to take advantage of these enhanced applications. Thus, a user must make sure to use the right application, i.e., the real camera application or the remote image fetch application. In accordance with one or more embodiments of the present invention, a combination of transformers and VAs addresses these concerns.

To install pervasive computing services application software on a mobile device two steps are utilized. The first step is to install a pervasive computing services virtual appliance, referred to herein as a PerComm Virtual Appliance or PerComm VA, that executes on top of virtualization software 300. The second step is to direct the particular virtual and physical devices to be routed through the PerComm VA. This may require explicit action by an owner of the mobile device since it might expose the handset's physical resources to outsiders.

Next, data and control coming out of a VM is routed up to the PerComm VA. The PerComm VA executes in user mode in its own address space, and virtualization software 300 controls the virtual to machine address mapping and can arrange it to avoid data copy (when converting a stream to network packets; however, it may not be impossible to avoid a copy). The PerComm VA passes this data and control to a remote device through a Bluetooth connection, wifi or some other wireless communication device. The user may be given control over when and which devices are to be handled by the PerComm VA. Data and control information from the remote device is communicated to the PerComm VA, and the PerComm VA can forward this data and control information to transformer stack 350 (or virtualization software 300) which then directs it to a VM. The VM thinks it is interacting with a local device, but the interaction is being mediated by the PerComm VA.

There will be times when virtualization software 300 must he updated or patched. Similarly, there may be times when a VM on a handset is under the control of a remote entity such as an enterprise owning a virtual work phone that is installed on an employee's personal handset (this is described in more detail below). In accordance with one or more embodiments of the present invention, management of physical devices accessed by a "workphone," can he controlled by a remote enterprise server. In accordance with one or more such embodiments, a management module, for example, management client 340, residing in virtualization software 300, will support appropriate authentication, authorization, security protection, and policy rules to enable this to happen. In addition, in accordance with one or more further embodiments of the present invention, an owner or user of a handset can perform similar management operations for other VMs, i.e., VMs not controlled by input from a remote enterprise server. In such a case, the management module may be the same as the management module responding to the remote enterprise server, but it will take its commands in this from, for example and without limitation, a remote link or keyboard commands.

Use Management: One or more embodiments of the present invention provide methods for managing use of a mobile device (for example, and without limitation, a cell phone) by managing the use of one or more applications provided by the mobile device. Thus, in accordance with one or more such embodiments, an enterprise may limit or control use of an employee's enterprise-managed mobile device, for example, and without limitation, by managing telephone calls to manage expenses. In particular, and in accordance with one or more such embodiments of the present invention, virtualized mobile device 100, (for example, and without limitation, a virtualized cell phone) includes virtualization software layer 300 (for example, a hypervisor) which supports one or more VMs $400_1$-$400_n$, having a guest operating system ("guest OS") and guest applications. In accordance with one or more such embodiments, management client 340 in virtualization software 300 is in contact with an enterprise server (i.e., management server 500) using any one of a number of methods that are well know to those of ordinary skill in the art such as, for example, and without limitation, via a telephone network, or via a wi-fi or wifi network {as is known, Wi-Fi is a trademark of the Wi-Fi Alliance, founded in 1999 as WECA (Wireless Ethernet Compatibility Alliance), which organization comprises companies whose products are certified by the Wi-Fi Alliance based on IEEE 802.11 standards (also called WLAN (Wireless LAN) and Wi-Fi)—the certification warrants interoperability between different wireless devices}, and so forth. In accordance with one or more alternative embodiments, a VM in virtualized mobile device 100 is in contact with management server 500 through virtualization software 300 using any one of a number of methods of communicating through a virtualization software layer that are well known by those of ordinary skill in the art.

In accordance with one or more such embodiments, management server 500 transmits control information to virtualized mobile device 100 that is used to limit the use of any one of a number of guest applications executing on virtualized mobile device 100. For example, and without limitation, in accordance with one or more embodiments of the present invention, management server 500 may transmit control information comprising limits to management client 340 in virtualization software 300, or alternatively, through virtualization software 300 to a VM (in accordance with any one or a number of methods that are well known to those of ordinary skill in the art). The control information may be multi-dimensional in that it may be used to control any number of applications. For example, and without limitation, the control information may be used to control one or more of the following uses by appropriate identification of particular applications to be controlled: (a) limit network usage to a predetermined or dynamically changeable (for example, by real time input of control information from the enterprise server) number of minutes; (b) limit a number of sms messages (as is known, Short Message Service (SMS) is a communications protocol allowing interchange of short text messages between mobile telephone devices) to a predetermined or dynamically changeable (for example, by real time input of control information from the enterprise server) number; (c) limit data transfers to a predetermined or dynamically changeable (for example, by real time input of control information from the enterprise server) number; or (d) limit game usage to one or more predetermined games or to a predetermined or dynamically changeable (for example, by real time input of control information from the enterprise server) amount of use by time (by virtualization software). As one can readily appreciate, the enterprise can dynamically modify the control information in response, for example, and without limitation, to budgetary changes, and the control information may vary by user group (where a user group may be identified, for example, and without limitation, by a user identification that is set when configuring the virtualized mobile device, and stored and/or accessed by virtualization software 300 and/or the VMs).

In accordance with one or more embodiments of the present invention, applications (referred to herein as guest applications) are executed within a guest OS which runs on top of virtualization software 300, for example, a hypervisor, in virtualized mobile device 100. In such a virtualized mobile device, cellular network communication, for example, and without limitation, telephone calls, sms messages, 3G/Edge/GPRS messages {as is known, 3G was initially marketed as a way to make video calls on a mobile network but is also a way of browsing the internet and communicating on a smart phone using voice over IP and by email and instant messaging; GPRS is a system used to transmit data at speeds of up to 60 kbits per second and is a battery friendly way to send and receive emails and to browse the internet; and EDGE (Exchanged Data rates for GSM Evolution) is a recent development based on the GPRS system and has been classified as a "3G" standard due to the fact that it can run at up to 473.6 kbits per second. If a smart phone is EDGE compliant it can be used for heavy mobile data transmission such as receiving large email attachments and browsing complex web pages at high speed}, and so forth, that are initiated from either guest applications or guest OSs, generate guest OS device driver actions that will be trapped, and are handled by device drivers in virtualization software layer 300. In other words, in virtualized mobile devices, guest OS device drivers do not communicate directly with communication devices, but rather communicate through the device drivers of virtualization software layer 300.

In addition, and in accordance with one or more embodiments of the present invention, the guest OS may send data packets over a wifi, cellular, USB, or Bluetooth network (as is known, Bluetooth is a wireless protocol for exchanging data over short distances from fixed and mobile devices). In accordance with one or more such embodiments, in any of these cases, guest OS device driver actions will be trapped by virtualization software layer 300, and, in turn, carried out by the device drivers of virtualization software layer 300. In accordance with one or more such embodiments, the device drivers of virtualization software layer 300 may use a different network for the communication than that specified by the guest OS. For example, and without limitation, the guest OS may send a packet over the 3-G network, but in reality, the device driver of virtualization software layer 300 may send it over the wifi network. In addition, at other times, the device driver of virtualization software layer 300 will use the same communication mechanism indicated by the guest OS.

In any case, in accordance with one or more embodiments of the present invention, virtualization software layer 300 can limit the communication. In particular, in accordance with one or more such embodiments, a network driver in virtualization software layer 300 can count packets sent and received over the cellular network, and transmit that usage information to virtualization software layer 300. In turn, virtualization software layer 300 can, itself curtail communications over that network when one or more limits provided in the control information are reached; where a particular limit may be used to limit a particular type of functionality of the virtualized mobile device. In particular, reaching a limit may be determined by computing a difference between usage information and a limit, and determining that the difference exceeds or is equal to a predetermined amount where, for example and without limitation, the predetermined amount may be included in the control information or it may be a configuration parameter. For example, and without limitation, one limit may pertain to sms messages, another limit may pertain to telephone calls, and still another limit may pertain to a particular game. In accordance with one or more alternative embodiments, the usage information may be sent to a VM which analyzes the usage information against the one or more limits. Also, in accordance with one or more further embodiments, a transformer or combination of transformers in transformer stack 350 can count packets sent and received over the cellular network and can, itself/themselves, curtail communications over that network when one or more limits provided in the control information are reached or exceeded. In any of these cases, exceeding a particular limit will cause predetermined actions to be carried out, which predetermined actions may be indicated in the control information. For example, exceeding a particular limit may be absolute in the sense that the mobile device may be rendered inoperable; or exceeding a particular limit may be "soft," i.e., less than absolute in the sense that a particular functionality may be rendered inoperable; or it may be "softer," i.e., in the sense that the particular functionality may be degraded so that, for example, and without limitation, the mobile device may be used to make and receive telephone calls only to particular area codes. In addition, in conjunction with invoking the controls, a VM may provide information to a user that describes the action being taken either by displaying such information on a display associated with the mobile device and/or by sending a text message and/or by sending a voice mail message and/or by sending an e-mail message.

Thus, in accordance with one or more embodiments of the present invention, a number of mobile phone minutes used by the mobile device can be controlled by virtualization software 300, or by a transformer, or by a VM (for example, and without limitation, a specific purpose VM) keeping track of the number of minutes that a GSM {as is known, GSM (Global System for Mobile communications: originally from Groupe Spécial Mobile) is a popular standard for mobile phones; GSM differs from its predecessors in that both signaling and speech channels are digital, and thus is considered a second generation (2G) mobile phone system) or CDMA (as is known, Code-Division Multiple Access is a digital cellular technology that uses spread-spectrum techniques} driver is connected, and having the virtualization software layer—on its own or in response to a message from the VM—disabling a connection when a limit is reached or by transformer—by not setting up further connections until the mobile device is re-initialized by, for example, and without limitation, resetting an authorization using, for example, a user ID and pin to provide the authorization.

In addition, virtualization software 300, using management client 340 or using a VM set aside for this purpose, may periodically communicate back to management server 500 for instructions, for example, updates, as to which communications/applications ought to be limited and how.

Location-based Security: In accordance with one or more embodiments of the present invention, based on physical location of a mobile device, and based on one or more location and time based security policies, it may or may not require a password or pin to access one or more of its features.

Typical mobile device security policy requires a user to enter a password into her/his mobile device to "unlock" it because, when the mobile device is inactive for a specified period of time, usually several minutes, the mobile device automatically locks. For example, after a period of inactivity (for example, no keys are pressed), the screen and keyboard lock, and the only input permitted is the user's password. Once the password is entered, the screen and keyboard become active (it is usually the case that daemons and background processes continue to execute to enable such functionality). Alternatively, when a phone call comes in, the user is allowed to answer the call with the screen or keys, but the rest of the device remains locked. Many users find this security feature annoying as they may have to enter their password dozens or more times each day.

In accordance with one or more embodiments of the present invention, mobile device access security, for example, and without limitation, by password entry, is based on physical location or physical location and/or time spent at the physical location (location-time) of the mobile device. In accordance with one or more further embodiments of the present invention, a specific security policy may be a centrally-managed security policy, and it can be changed by communication from, for example, and without limitation, an enterprise server.

In accordance with one or more embodiments of the present invention, mobile device access policy may require, for example, and without limitation, a password only when the user is physically away from an office or home location (i.e., a location based scenario). In accordance with one or more such embodiments, the mobile device is a virtualized mobile device wherein a multiplicity of VMs enable the virtualized mobile device to provide a multiplicity of, for example, and without limitation, phones (i.e., virtual phones where one virtual phone may be a corporate mobile phone and another virtual phone is a personal mobile phone) wherein each of the virtual phones may have its own security policy. As such, and in accordance with one or more such embodiments, access to a corporate mobile phone may have stronger security requirements than a personal mobile phone.

In accordance with one or more embodiments of the present invention, the virtualized mobile device determines its current geographic location. Such a determination of location can be based on obtaining information: (a) from a built-in GPS device; (b) from an external GPS device (for example, a GPS device in a car which communicates with the mobile device, say via a USB cable or wirelessly via a Bluetooth connection); (c) from detection of cell towers using any one of a number of methods that are well known to those of ordinary skill in the art; (d) from known Bluetooth devices whose location is known (for example, a desktop PC may have a Bluetooth device whose identifier is known to the mobile device and whose location is also known so that when the mobile device is within range of the desktop PC's Bluetooth signal, the mobile device knows that it is near the desktop); (e) from wifi base stations using any one of a number of methods that are well known to those of ordinary skill in the art; (e) from near-field communications triggered on entering a facility through an entryway protected by such near-field communication using any one of a number of methods that are well known to those of ordinary skill in the art; or (f) from use of some other mechanism. Such a determination of location can be obtained using virtualization software 300 or it can be initiated and noted by a VM, for example, and without limitation, a specific VM used for this purpose (referred to here as the security VM), communicating through virtualization software layer 300. Once, the location and, optionally, the time at the location is known, the security VM may compare the information with a security policy, and carry out an appropriate action indicated by the comparison.

In accordance with one or more embodiments of the present invention, there are many levels or degrees of "proof" that provide evidence that a mobile device is in a secure location. For example, the mobile device may be required to be at any one of a number of locations for a predetermined amount of time (i.e., a location-time based scenario). For example, the mobile device may have to be at a location designated as the office for at least an hour before the need for password entry to prevent locking is disabled. As another example, the time period before locking the mobile device may be extended when the mobile device is in any one of a number of predetermined locations. As yet another example, a decision regarding whether or not to lock the mobile device after a predetermined time period of no activity may depend on the time of day. For example, if an employee follows a schedule of arriving at work at 9:00 am and returning home at 7:00 pm every weekday, and the employee is at home every weekend and holiday, then only during these time periods when the mobile device is at the predetermined location will password locking be disabled. As yet still another example, if the mobile device phone is "alone," i.e., it does not detect the presence of other mobile devices nearby, then password locking may be disabled. In accordance with one or more such embodiments, the mobile device (for example, the security VM) determines whether it is alone by scanning for other mobile devices via their Bluetooth radio using any one of a number of methods that are well known to those of ordinary skill in the art. If some mobile device responds, then, even in an office, the mobile device might require a password. Advantageously, this is of use when one leaves one's mobile device on one's office desk. If someone else comes into the office and tries to use that mobile device, that person would have to enter a password.

In accordance with one or more embodiments of the present invention, to mitigate location spoofing (for example, location information can be spoofed if an OS, for example, one of the guest OSs, is compromised), a server, for example, management server 500 shown in FIG. 1, may keep track (for example, by having the mobile device (for example, the security VM) report this information) location of the mobile device as it moves. Then, software at the server analyzes location changes using any one of a number of methods that are well known to those of ordinary skill in the art. The analysis will verify that the mobile device is in a previously identified location to confirm that the mobile device is located where it believes it is from data the mobile device obtains as set forth above, i.e., using GPS data and so forth. A server that maintains a detailed history of the mobile device over many weeks or months can verify that the sequence of recent location transitions of the mobile device is consistent with its history of location transitions in accordance with any one of a number of methods that are well known to those of ordinary skill in the art.

In accordance with one or more embodiments of the present invention, the mobile device (for example, the security VM) may store information (for example, and without limitation, a bit) when the mobile device enters a predetermined, registered location (for example, and without limitation, a workplace, home, or some other registered location) to indicate that the mobile device is at a trusted location. As a result of being in a trusted location, the mobile device is not automatically locked. Then, when the mobile device leaves the predetermined registered location, it reverts back to its normal mode. In accordance with one or more such embodiments, entry into a predetermined registered location may be validated by having the mobile device (for example, the security VM) communicate with a server (for example, management server 500), and having the server verify that the location is a predetermined registered location and that approval for considering it to be trusted is given. For example, when entering one's office, the mobile device (for example, the security VM) may detect a local wifi base station, and use that station to verify its location. In accordance with one or more such embodiments, the server (for example, management server 500) may also query the wifi base station to determine whether it has just registered the mobile device as well.

Although embodiments of the present invention were described in terms of security provided by password entry, further embodiments can be fabricated based on various security schemes. For example, various functionality provided by the mobile device could be controlled based on location. For example, and without limitation, access to different files or volumes could be location based, or applications could be executed only when the mobile device is present at predetermined certain secure locations.

In accordance with one or more of the above-described embodiments, to further avoid location spoofing, encrypted communication between the mobile device and a server may be used so that the server can assure the user that its tracking of the mobile device is secure. If the mobile device (either the virtualization software or a VM assigned to the task) detects a breach of security (for example, by comparison with a recorded history of locations of the mobile device to ensure consistent behavior), the virtualization software, on its own or in response to instructions from the VM or from the server, can lock screens and/or the keyboard of the mobile device. Alternatively, one or more transformers in transformer stack 350 may be utilized to block access to screens and/or the keyboard.

In accordance with one or more embodiments of the present invention, when an analysis indicates that a lock is needed, for example, and without limitation, by expiration of a time-out or transit to an unsecure location, a VM that provides a predetermined functionality (for example, and without limitation, making telephone calls) may be suspended when a lock is invoked in addition to locking the screen and/or the keyboard. In this instance, the virtualization software may acknowledge receipt of communications by the mobile device, but they are queued up in the virtualization software until the VM is awakened. Alternatively, functionality may be suspended by passing control information to one or more transformers in transformer stack 350 to cause it/them to suspend or later enable predetermined functionality.

In accordance with one or more embodiments of the present invention, instead of the mobile device tracking its own location, in some circumstances, carriers themselves would verify the location of the mobile device (for example, for 911 calls, a carrier tells police a phone's location). Then, the carriers would send the location information to the mobile device or to a server which would forward that location information to the mobile device.

Restrict malware in a mobile device: Security may be breached if a mobile device is compromised by malware. For example, such malware may be used to enable one to listen in on private conversations, track movements, access private information such as URLs, e-mails, contact lists, pins, and so forth. The breach of security may be more serious in the case of mobile devices because, typically, such mobile devices are always on, but the user may not be watching it. As a result, simply alerting the user to suspicious behavior may be useful, but insufficient. In addition to this, prevention of being spied upon by means of one's own mobile device is more difficult than traditional detection of malware. This is because mobile devices are vulnerable to types of attacks that use benign actions on the mobile device. For example, there are many applications that keep track of a user's location and update a remote server—many of these are social networking applications, and the owner of the mobile device may permit such operations. As another example, there are other applications that may spawn some action based on the location of the mobile device, such as "geotagging." As still another example, there are still other applications that record what a user is saying, and send the recording to a remote server for voice recognition processing. Also, it is possible to combine these applications so that, based on time and place, they will trigger the mobile device to start recording microphone input, and to send that information to a third party server. Although a user may not want this to happen, it is hard to prevent since applications themselves may all be valid applications. Traditional virus detection products will not detect such security breaches.

In accordance with one or more embodiments of the present invention, in a virtualized mobile device, there are one or more "virtual" phones on a mobile device, for example, and without limitation, a handset, which virtual phones execute as a guest application on a guest OS (referred to as a VM) that executes on top of a virtualization software layer (for example, a hypervisor). As was described above, in the virtualized mobile device, each guest OS does not directly access physical devices, but rather, guest OS accesses of guest devices are trapped to the virtualization software layer, and access to the physical devices is actualized by the virtualization software layer to carry out an appropriate operation on the real device.

In accordance with one or more embodiments of the present invention, virtualization software layer 300 collects information related to the status of real device drivers, and sends this information, for example, and without limitation, on a periodic basis, to a virus protection software module in the virtualization software layer or in a specific VM set aside for this purpose (referred to here as a security VM). In accordance with one or more such embodiments, the virus protection software module has a set of rules that may trigger action based on the information it receives concerning one or more of the physical device drivers. For example, and without limitation, a rule might state that an alarm should be raised whenever an audio microphone is enabled and a TCP connection is enabled to a particular set of destination addresses. In accordance with one or more such embodiments, a security server (for example, management server 500) may transmit "rules sets," for example, and without limitation, to the mobile device on a periodic basis. Further, in accordance with one or more further such embodiments, raising an alarm includes sending alerts to a user such as, for example and without limitation, by providing a voice message and/or text message and/or providing a message on a screen and/or blinking a screen display. In addition, in accordance with one or more further embodiments, raising an alarm may entail locking the mobile device to one or more predetermined applications related to or associated with a particular set of rules. Such locking may occur by sending control information to one or more transformers of transformer stack 350, or such locking may occur by disabling communications to one or more of the VMs in the mobile device.

Mobile Migration: A running VM can he checkpointed, and its entire state encapsulated into a single file. This file can be used to continue execution of the VM at either a later time or on a different computer or handset. It is a useful feature for a VM on a handset to migrate to another handset so that computation can he closer to peripheral devices when wireless latency is too long or there are insufficient resources on a handset or some other embedded device. In accordance with one or more embodiments of the present invention, a functionality of a mobile device such as, for example, and without limitation, a telephone functionality, is migrated from one mobile device to another or from one mobile device to a netbook computer, a laptop computer, a desktop computer, or any other computerized device with sufficient compute power and connectivity. In accordance with one or more such embodiments, the functionality is first embodied using a VM, and then, the VM is migrated using one or more methods that are well known to those of ordinary skill in the art such as a method referred to as Vmotion used by VMware, Inc. of Palo Alto, Calif. Advantageously, one or more embodiments of the present invention enable a user to "move" his/her telephone from one physical device to another, for example, and without limitation, to enable the user to use an appropriate telephone based on the user's location or simply for fashion. In accordance with one or more such embodiments, the migration can be implemented using a wireless carrier or using a wifi or physical wire connection. In accordance with one or more embodiments, the method of migration includes selecting a target mobile device, serializing the VM embodying the virtual telephone, and transferring the serialized VM from the source mobile device to the target device, for example and without limitation, by streaming. In accordance with one or more further embodiments, the method of migration includes transferring the serialized VM embodying the virtual telephone to a computer or other intermediary, for example, and without limitation, a service provider using management server 500 or another mobile device, and then transferring the serialized VM to the target device. In accordance with one or more such embodiments, the method further includes: (a) reprogramming the source and target SIM chips in accordance with any one of a number of methods that are well known to those of ordinary skill in the art to receive calls only at the target mobile device; or (b) virtualizing and transferring the SIM chips along with the VM (note that a SIM, its reader and control circuitry is a hardware device and, as such, its function can be emulated in a manner similar to the way other hardware devices are virtualized); or (c) informing the service provider of the change and having the service provider redirect calls only to the target mobile device.

In accordance with one or more embodiments of the present invention, there are several different types of migration: (a) self-service installation of a VM on a handset; (b) cold motion—this entails shutting down a VM, moving it, and then starting it up on another device; (c) warm motion which entails suspending or checkpointing a VM, moving its state to another handset, and then resuming its execution on the other handset; (d) hot motion (or live migration) wherein, while a VM is running on one handset, and moving it to another handset as if it never stopped running; (e) cloning which includes any of the above, but with the VM either also running on the original handset or ensuring that there is only one instance of the VM running on any handset at any one time.

Self-service installation of a VM: There are many ways to get a VM onto a mobile device, for example, a telephone—(i) usb cable, (ii) sd card, or (iii) download over the air. In accordance with one or more embodiments of the present invention, when virtualization software is executing on a mobile device such as a handset, a user can do a self-service checkout of a VM. To do this, in accordance with one or more such embodiments, the user: (a) goes to a web site hosted by a server referred to herein as a "self-service" server, for example and without limitation, identified as http://www.acme.com/virtualphone.html; (b) logs on; (c) enters a passcode, for example and without limitation, a telephone number, associated with the mobile device (there may be several passcode, for example, telephone numbers, associated with a mobile device where, for example and without limitation, one passcode, for example, telephone number may be associated with a particular VM); and (d) selects a desired VM for that passcode, for example, telephone number. The self-service server, for example, management server 500, sends a message, for example, an sms message, to the mobile device, for example, by telephone using a communication channel associated with the passcode, for example, at the specified telephone number, and the message contains a communications link to the predetermined VM, for example, link may be a url to the server with a unique code at the end of the url—for example, http://www.acme.com/downloadvirtualphone/abcd1234. The code abcd1234 identifies the particular user and the desired VM. At the same time, the virtualization software or a VM set aside for this purpose (referred to as an installation VM) awakens a device driver and causes it to be ready to fetch the VM. In accordance with one or more such embodiments, the act of contacting the server causes the virtualization software or the installation VM to go to that server to start downloading the VM. In accordance with one or more such embodiments, the virtualization software can either snoop on the browser traffic or snoop on SMS traffic, but in either case, this snooping is what informs the virtualization software of the action it should take as well as an IP address at which it should fetch the data.

In accordance with one or more further such embodiments, authentication, certification, and encryption protect against man-in-the-middle attacks. To avoid using a third party certification authority such as Verisign, a protocol may be used that depends on a public key crypto system in which the virtualization software has a public key and the self service server has its own public key that is encrypted using the virtualization software creator's private key. Another way to say this is as follows. One or more such embodiments entail participation of three entities or software systems—the self-service server (S), the virtualization software (V), and the distributor or creator of the virtualization software (C). The virtualization software that is installed on the handset contains a public key of C, call this public-C. In order for the virtualization software and the server to communicate securely, C will need the public key of S. C will also need to know that S is certified and is not a fake site. Self service server S will have its public key, public-S, encrypted using the creator's private key. The only way to decrypt this is with the creator's public key, but that is already in the virtualization software. So, if the virtualization software can use the public key from the creator to decrypt the message that contains the server's public key, then the virtualization software knows that the server is authentic. Alternatively, the installation VM may be used instead of the virtualization software.

Cold Motion (the term "cold" refers to the fact that the VM is shut down before the move): In accordance with one or more embodiments of the present invention, the VM contains everything needed to be run in a few files. As such, moving these files to a new handset device allows the VM to run on that device. The VM has a set of peripheral devices that may or may not be identical to those on the source device. Further, the destination device may have different peripheral devices, a different architecture generation, or even a different architecture altogether. In accordance with one or more such embodiments, the peripheral devices are virtualized, and device transformers in the virtualization software map one device to another.

Warm Motion: In accordance with one or more embodiments of the present invention, a VM is moved from one handset to another, and its execution is resumed on the second handset.

Hot Motion: In accordance with one or more embodiments of the present invention, this is the same as live migration between host computers where a VM is moved while executing. In accordance with one or more embodiments of the present invention, live migration occurs by checkpointing a VM, migrating the checkpoint, and starting it up on another mobile device, but with the VM either also running on the original mobile device or ensuring that there is only one instance of the VM running on any mobile device.

In accordance with one or more embodiments of the present invention, if a communication is in progress, and if the communication is over wifi, the virtualization software on the initial device will forward the packets to the virtualization software on the new device until the communication stream terminates. New communications will automatically bypass the initial device. In this case, the virtualization software acts like a NAT (network address transformer) so that the VM has the same IP and MAC address, but a new IP and MAC address are presented to remote devices. If the communication is over a cellular network, either a phone call or IP, then the solution is different. There are two possible solutions. One solution is for each virtual phone to have its own unique phone number. This number phone is at a server at a stable location. In accordance with such a solution, calls do not come directly to or from the phone, but rather from this stable location. Further, incoming phone calls are forwarded to the handset that contains the virtual phone. Still further, the real caller-id of the initiated phone call will be placed in the record by the server so the handset will see the original caller id and not the caller id of the stable location. If there is a need for the handset to know if the call was to a particular VM, the server can convey that information to the handset at a later time. For example, the "received phone call" log on each virtual phone can be fixed up after the phone call terminates by a message from the stable server. The second solution is to have either multiple SIMs in a phone or to virtualize the SIM. Certain phones will permit the baseband processor to be virtualized. In such cases, the virtualization mobile device would run two or more copies of the baseband code, providing each with virtualized SIM data and multiplexing the radio antenna. In either case, during hot motion the original handset must make an audio connection to the destination handset. This can be done in any of a number of ways: the remote device can be made to act like a Bluetooth headset so that the speaker audio is wirelessly communicated to the remote device and it receives audio from the remote device as if it came from the microphone. Wifi can be made to transmit audio in either direction just like a Bluetooth connection.

Cloning: In any of the previous motion modes, it has been assumed, although not stated, that a virtual phone executes on only one handset at a time, i.e., after it is moved from the original handset, it no longer executes on that handset until, if ever, it is moved back onto it. However, in accordance with one or more embodiments of the present invention, a virtual phone is "cloned" so that there are two virtual phones, i.e., one that continues executing on the original phone and one that starts running on the destination phone. When a virtual phone is executing on two or more different handsets, then the following behavior is appropriate. An incoming phone call will cause each of the virtual phones to ring, just like having multiple extension phones in a tradition land-line phone scenario. In fact, the only difference between cloned phones and multiple extensions is what happens when there is no phone call involved. With telephone extensions, picking up two extensions usually means that they can talk to each other without making a phone call. With cloned phones this is not possible.

Locked-down mobile appliance: There is no satisfactory common platform that provides a secure environment for sensitive applications in the mobile device space. Java does not, as promised, provide a common platform for write once, run anywhere, programming in the mobile space, particularly in a secure manner. There are also many organizations such as banks, insurers, broker-dealers, that would like to provide a secure application to allow users to access their accounts and information in a secure manner. In accordance with one or more embodiments of the present invention, organizations can package a VM as a "mobile appliance," and distribute it to users to run in a virtualized mobile device. In accordance with one or more such embodiments, a virtualization software layer would isolate the appliance, and prevent unauthorized access to it. The appliance is an image or data file that contains code and data. It may be encrypted on the device storage so that no other VM or application can access the data or modify the code. When the appliance executes, pages of the image are brought into the SRAM or memory and decrypted by the virtualization software. Other technologies borrowed from ACE or offline-VDI can be implemented to protect and manage the mobile appliance.

Persons skilled in the art will understand that various modifications and changes may be made to the specific embodiments described herein without departing from the broader spirit and scope of the invention as set forth in the appended claims. The foregoing description and drawings are, accordingly, to be regarded in an illustrative rather than a restrictive sense.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of controlling usage in a mobile device comprised of a virtualization software layer that supports one or more virtual machines, the method comprising:
   receiving control information at the mobile device from a management server that communicates the control information to the virtualization software layer, wherein the control information includes one or more limits pertaining to one or more uses of the mobile device;
   collecting usage information relating to a use in the one or more uses by a virtual machine supported by the virtualization software layer;
   determining whether the usage information relating to the use exceeds a corresponding limit in the one of the one or more limits included in the control information; and
   if the usage information corresponding to the use exceeds the corresponding limit, carrying out, via the virtualization software layer, a predetermined action relating to the use based on the control information to limit the use by the virtual machine.

2. The method of claim 1 wherein the use is provided by a guest application in the virtual machine.

3. The method of claim 1 wherein the use pertains to data network usage, use of a telephone network, or use a game or an application.

4. The method of claim 1 wherein exceeding the corresponding limit causes the virtualization software layer to render the mobile device inoperable in making outgoing telephone calls.

5. The method of claim 1 wherein exceeding the corresponding limit causes the virtualization software layer to degrade a particular functionality of the mobile device.

6. The method of claim 1 wherein:
   the usage information is for use of a telephone network, and
   the virtualization software layer limits a telephone functionality provided by the virtual machine regarding the use of the telephone network.

7. The method of claim 1 wherein the control information is stored in the virtualization software layer or in the virtual machine.

8. The method of claim 1 wherein the management server dynamically updates the control information via the virtualization software layer.

9. The method of claim 1 wherein collecting comprises collecting the usage information in the virtualization software layer.

10. The method of claim 1 wherein the virtualization software layer receives a request for the predetermined action for performing the use from the virtual machine and limits the performing of the predetermined action when the use exceeds the corresponding limit.

11. An apparatus configured to control usage in a mobile device comprised of a virtualization software layer that supports one or more virtual machines, the apparatus comprising:
one or more computer processors; and
a computer-readable storage medium comprising instructions for controlling the one or more computer processors to be operable to:
receive control information at the mobile device from a management server that communicates the control information to the virtualization software layer, wherein the control information includes one or more limits pertaining to one or more uses of the mobile device;
collect usage information relating to a use in the one or more uses by a virtual machine supported by the virtualization software layer;
determine whether the usage information relating to the use exceeds a corresponding limit in the one of the one or more limits included in the control information; and
if the usage information corresponding to the use exceeds the corresponding limit, carry out, via the virtualization software layer, a predetermined action relating to the use based on the control information to limit the use by the virtual machine.

12. The apparatus of claim 11 wherein the use is provided by a guest application in the virtual machine.

13. The apparatus of claim 11 wherein exceeding the corresponding limit causes the virtualization software layer to render the mobile device inoperable in making outgoing telephone calls.

14. The apparatus of claim 11 wherein exceeding the corresponding limit causes the virtualization software layer to degrade a particular functionality of the mobile device.

15. The apparatus of claim 11 wherein:
the usage information is for use of a telephone network, and
the virtualization software layer limits a telephone functionality provided by the virtual machine regarding the use of the telephone network.

16. The apparatus of claim 11 wherein the control information is stored in the virtualization software layer or in the virtual machine.

17. The apparatus of claim 11 wherein the management server dynamically updates the control information via the virtualization software layer.

18. The apparatus of claim 11 wherein collecting comprises collecting the usage information in the virtualization software layer.

19. The apparatus of claim 11 wherein the virtualization software layer receives a request for the predetermined action for performing the use from the virtual machine and limits the performing of the predetermined action when the use exceeds the corresponding limit.

20. A non-transitory computer-readable storage medium containing instructions configured to control usage in a mobile device comprised of a virtualization software layer that supports one or more virtual machines, the instructions for controlling a computer system to be operable to:
receive control information at the mobile device from a management server that communicates the control information to the virtualization software layer, wherein the control information includes one or more limits pertaining to one or more uses of the mobile device;
collect usage information relating to a use in the one or more uses by a virtual machine supported by the virtualization software layer;
determine whether the usage information relating to the use exceeds a corresponding limit in the one of the one or more limits included in the control information; and
if the usage information corresponding to the use exceeds the corresponding limit, carry out, via the virtualization software layer, a predetermined action relating to the use based on the control information to limit the use by the virtual machine.

* * * * *